US012695098B1

(12) United States Patent
Hartwig et al.

(10) Patent No.: US 12,695,098 B1
(45) Date of Patent: Jul. 28, 2026

(54) MINIATURE LITHIUM ELECTROCHEMICAL CELL WITH GROOVED ROD-SHAPED CATHODE CURRENT COLLECTOR

(71) Applicant: Greatbatch Ltd., Clarence, NY (US)

(72) Inventors: Jordan A. Hartwig, East Aurora, NY (US); Daniel M. Baumer, Middleport, NY (US); Gregory A. Voss, Alden, NY (US); Joseph M. Lehnes, Williamsville, NY (US)

(73) Assignee: Greatbatch Ltd., Clarence, NY (US)

( * ) Notice: Subject to any disclaimer, the term of this patent is extended or adjusted under 35 U.S.C. 154(b) by 802 days.

(21) Appl. No.: 18/099,566

(22) Filed: Jan. 20, 2023

Related U.S. Application Data

(60) Provisional application No. 63/301,603, filed on Jan. 21, 2022.

(51) Int. Cl.
　　H01M 4/78 　　　　(2006.01)
　　H01M 4/02 　　　　(2006.01)
　　　　　(Continued)

(52) U.S. Cl.
　　CPC ............. H01M 4/78 (2013.01); H01M 4/382 (2013.01); H01M 4/5835 (2013.01);
　　　　　(Continued)

(58) Field of Classification Search
　　CPC ....................................................... H01M 4/78
　　See application file for complete search history.

(56) References Cited

U.S. PATENT DOCUMENTS

|  |  |  |  |
|---|---|---|---|
| 554,071 | A | 2/1896 | Matzen |
| 3,289,874 | A | 12/1966 | Dailey et al. |

(Continued)

FOREIGN PATENT DOCUMENTS

| CN | 202067860 | 12/2011 |
|---|---|---|
| CN | 103474669 A | 12/2013 |

(Continued)

OTHER PUBLICATIONS

Development of cylindrical PEM fuel cells with semi-cylindrical cathode current collectors, Suseendiran et al., Hydrogen Energy Publications LLC, Oct. 14, 2019.

(Continued)

*Primary Examiner* — Armindo Carvalho, Jr.
(74) *Attorney, Agent, or Firm* — Michael F. Scalise

(57) ABSTRACT

A miniature electrochemical cell has a total volume that is less than 0.5 cc. The cathode comprises $CF_x$ contacting a rod-shaped current collector and the anode comprises a lithium layer electrically connected to the cell casing. The lithium forms an anode lumen and the cathode having a cylindrical shape resides in the anode lumen. The rod-shaped cathode current collector has a cylindrically-shaped outer surface extending along a longitudinal axis. At least one helical groove recessed into the outer surface turns around the longitudinal axis at a constant distance while moving parallel to the axis or, a series of spaced-apart individual annular grooves recessed into the outer surface of the current collector are aligned perpendicular to the longitudinal axis. The helical groove or annular grooves prevent the $CF_x$ from sliding on the rod-shaped current collector. A separator segregates the anode from contacting the cathode, and an electrolyte activates the anode/cathode.

11 Claims, 9 Drawing Sheets

(51) Int. Cl.
| | |
|---|---|
| *H01M 4/38* | (2006.01) |
| *H01M 4/583* | (2010.01) |
| *H01M 50/107* | (2021.01) |
| *H01M 50/179* | (2021.01) |
| *H01M 50/188* | (2021.01) |
| *H01M 50/191* | (2021.01) |
| *H01M 50/545* | (2021.01) |

(52) U.S. Cl.
CPC ....... *H01M 50/107* (2021.01); *H01M 50/179* (2021.01); *H01M 50/188* (2021.01); *H01M 50/191* (2021.01); *H01M 50/545* (2021.01); *H01M 2004/027* (2013.01); *H01M 2004/028* (2013.01)

(56) References Cited

U.S. PATENT DOCUMENTS

| | | | |
|---|---|---|---|
| 4,347,293 | A | 8/1982 | Goebel et al. |
| 4,492,021 | A | 1/1985 | Wright et al. |
| 4,767,683 | A | 8/1988 | Yamada et al. |
| 6,010,801 | A | 1/2000 | Nakamaru et al. |
| 7,611,805 | B2 | 11/2009 | Duggan et al. |
| 8,790,819 | B1 * | 7/2014 | Freitag ................ H01M 50/466 434/262 |
| 9,118,047 | B2 | 8/2015 | Carlson |
| 10,811,729 | B2 | 10/2020 | Tsuji et al. |
| 11,862,804 | B2 | 1/2024 | Koshiol et al. |
| 2004/0058235 | A1 * | 3/2004 | Huang ................... H01M 6/06 429/211 |
| 2005/0249998 | A1 | 11/2005 | Minas et al. |
| 2007/0117021 | A1 * | 5/2007 | Frustaci .................. H01M 4/70 429/234 |
| 2007/0122697 | A1 * | 5/2007 | Wutz .................. H01M 50/566 429/180 |
| 2012/0154982 | A1 | 6/2012 | Ota et al. |
| 2013/0034761 | A1 | 2/2013 | Kaplin |
| 2013/0236756 | A1 | 9/2013 | Wang et al. |
| 2016/0308219 | A1 | 10/2016 | Keates et al. |
| 2017/0263933 | A1 | 9/2017 | Akikusa et al. |
| 2017/0358801 | A1 * | 12/2017 | Rubino ................ H01M 4/382 |
| 2018/0205091 | A1 | 7/2018 | Kim et al. |
| 2020/0006779 | A1 | 1/2020 | Lee et al. |
| 2020/0411878 | A1 | 12/2020 | Huang et al. |
| 2021/0043942 | A1 | 2/2021 | Takenaka et al. |
| 2022/0013876 | A1 * | 1/2022 | Baumer ............. H01M 50/627 |

FOREIGN PATENT DOCUMENTS

| | | | |
|---|---|---|---|
| JP | 2008192383 | A | 8/2008 |
| JP | 3148205 | B2 | 1/2009 |
| JP | 2011154788 | A | 8/2011 |
| JP | 2014143155 | A | 8/2014 |
| KR | 20160062883 | A | 6/2016 |
| WO | 2020039453 | A1 | 2/2020 |
| WO | 2021129905 | A1 | 7/2021 |

OTHER PUBLICATIONS

In re Dailey, 357 F.2d 669, 149 USPQ 47 (CCPA 1996).

* cited by examiner

MINIATURE LITHIUM ELECTROCHEMICAL CELL WITH GROOVED ROD-SHAPED CATHODE CURRENT COLLECTOR

CROSS-REFERENCE TO RELATED APPLICATION

This application claims priority to U.S. provisional patent application Ser. No. 63/301,603, filed on Jan. 21, 2022.

BACKGROUND OF THE INVENTION

1. Field of the Invention

The present invention generally relates to the conversion of chemical energy to electrical energy. More particularly, the present invention relates to an electrochemical cell having an electrode assembly comprising lithium electrically connected to the cell casing and a cathode active material that is contacted to a rod-shaped cathode current collector. Fluorinated carbon ($CF_x$) is a preferred cathode active material. To help prevent the active material from sliding axially along the current collector, the current collector is provided with a pattern of grooves into which the $CF_x$ is received in a press-fit contact. In one embodiment, the present electrochemical cell is a miniature cell having a total size or volume that is less than 0.5 cc.

2. Prior Art

U.S. Pat. No. 7,611,805 to Frustaci et al., which is assigned to the assignee of the present invention and incorporated herein by reference, relates to a lithium electrochemical cell. The cathode is of a powder fluorinated carbon ($CF_x$) that is pressed into intimate contact with a rod-shaped current collector having a plurality of flats that are offset with respect to each other. The flats help to prevent the cathode active material from sliding on the rod-shaped current collector.

While the flats of the prior art cathode current collector are acceptable for the electrochemical cell described in the '805 patent to Frustaci et al., they present features that are too large for incorporation into a miniature electrochemical cell. Specifically, in such a small electrochemical system as a miniature electrochemical cell having a total volume that is less than 0.5 cc., there is not enough $CF_x$ active material to adequately cover the flats. Instead, the flats are prone to poke though the active material and into contact with the separator enveloping the cathode. This means that the flats could cut through the separator during the manufacturing process and during cell discharge. Breaching the structural integrity of the separator could lead to an internal short-circuit condition.

Thus. there is a need for a new rod-shaped cathode current collector design that is useful with a wide variety of cathode active materials. Preferably, the rod-shaped current collector has feature that prevent the cathode active material from sliding in an axial direction along the current collector. Moreover, those features do not extend outwardly beyond a cylindrically-shaped outer surface of the rod-shaped current collector.

SUMMARY OF THE INVENTION

The present invention relates to an electrochemical cell comprising lithium as an anode active material that is either contacted to the inner surface of a casing or is in electrical continuity with the casing through anode current collector leads connected to the casing. The thusly formed tube-shaped lithium anode provides a lumen into which the cathode is received. The cathode is formed from a solid cathode active material, such as fluorinated carbon ($CF_x$), contacted to a rod-shaped cathode current collector. The preferred $CF_x$ material is formed into a cylindrically shaped body pressed into intimate contact with the rod-shaped cathode current collector. The cathode contained inside a separator envelope is slid into the lumen formed by the anode so that anode active material directly faces cathode active material in a 360° manner. An electrolyte is then filled into casing to activate the electrode assembly, and the casing is hermetically closed. That way, the casing serves as the negative terminal and the terminal pin of a glass-to-metal seal (GTMS) connected to the rod-shaped current collector serves as the positive electrode for the miniature electrochemical cell.

In order to augment contact of the cathode active material to the cathode current collector and to prevent potential movement of the $CF_x$ axially along the current collector, the rod-shaped member is provided with any one of a number of grooved patterns. There can be a helical groove as a three-dimensional narrow channel or depression that turns around the longitudinal axis of the rod-shaped current collector at a constant distance while moving parallel to the axis or a knurled pattern of two crisscrossing helical grooves that turn in opposite clockwise and counterclockwise directions around the longitudinal axis of the rod-shaped member while moving parallel to the axis. The grooved pattern can also be a series of spaced-apart individual annular grooves that are aligned perpendicular to the axis of the current collector.

An important aspect of the rod-shaped cathode current collector having the various grooved patterns is that the grooves do not extend outwardly beyond a cylindrically-shaped outer surface of the rod-shaped member. Instead, they provide recessed irregularly-shaped surfaces as a three-dimensional narrow channel or depression that help the cathode active material to maintain intimate physical contact with the current collector. That way, the grooves prevent the cathode active material from sliding in an axial direction along the current collector and from separating and delaminating from the outer surface of current collector.

The terminal pin of the GTMS is axially joined to a distal end of the rod-shaped cathode current collector rod. The terminal pin is preferably of molybdenum, while the rod-shaped cathode current collector is preferably of titanium or carbon coated titanium for use with $CF_x$. Since these materials are difficult to weld together, especially with the terminal pin being of a relatively small diameter, a portion of the terminal pin is received in an axial bore provided in the upper end of the rod-shaped cathode current collector. The other end of the terminal pin is supported in the GTMS and the ferrule of the GTMS seals the upper open end of the casing tube. The electrode assembly is activated with a nonaqueous electrolyte hermetically sealed inside the casing. This makes the present cell particularly useful for powering implantable medical devices, such as cardiac pacemakers, defibrillators, drug pumps, neurostimulators, and the like.

These and other aspects of the present electrochemical cell will become more apparent to those skilled in the art by reference to the following detailed description and to the appended drawings.

DETAILED DESCRIPTION OF THE PREFERRED EMBODIMENTS

A miniature electrochemical cell is defined as a cell of any chemistry having a size or total volume that is less than 0.5 cc.

As described in this detailed description, a helical groove is defined as a three-dimensional narrow channel or depression that turns around a longitudinal axis of a rod-shaped current collector at a constant distance while moving parallel to the axis.

Figure 1:
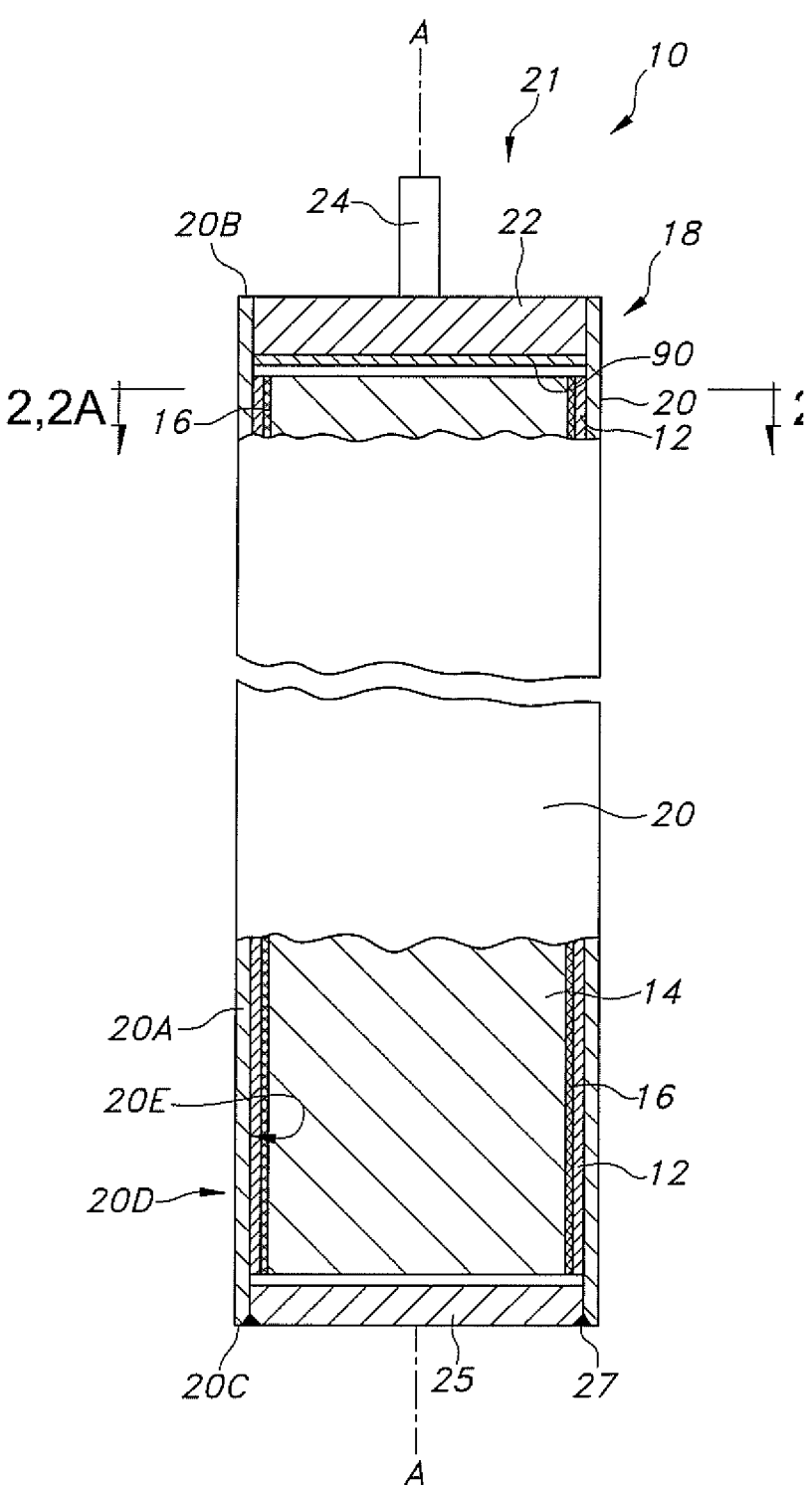
FIG. 1 is an elevational view, partly in cross-section, of an electrochemical cell 10 according to the present invention.
Figure 1A:
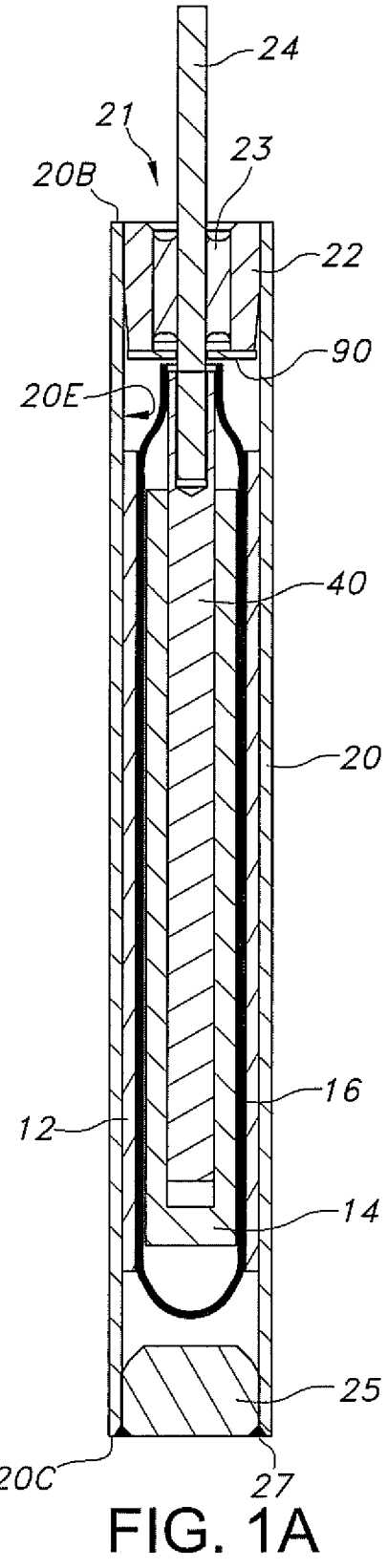
FIG. 1A is a cross-sectional view of the electrochemical cell 10 shown in FIG. 1.
Figure 2:
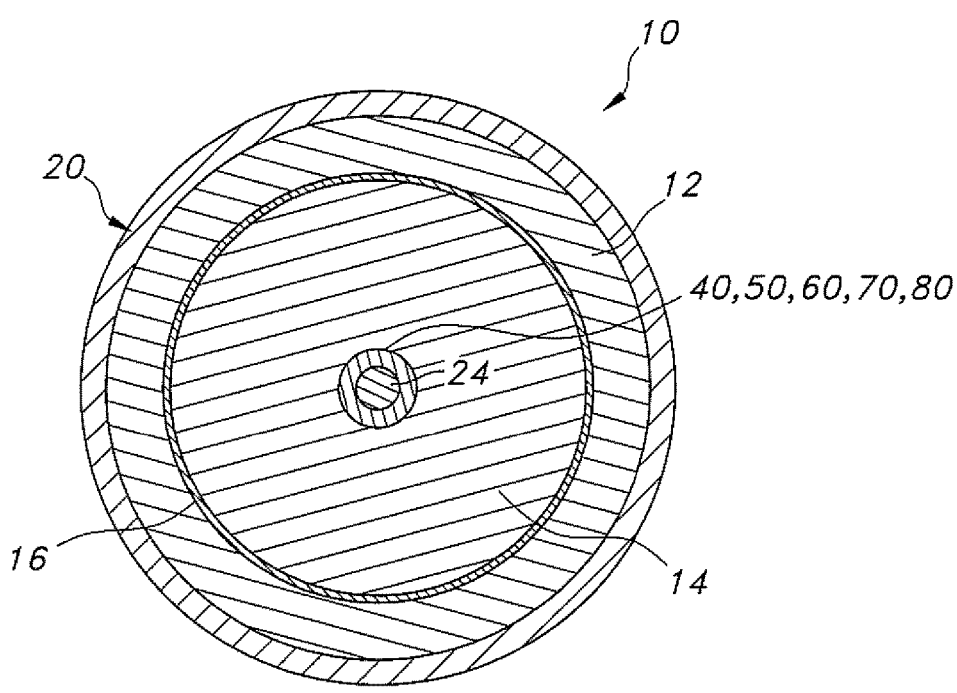
FIG. 2 is a cross-sectional view taken along line 2-2 of FIG. 1.

Referring now to the drawings, FIG. 1 is a partial cross-sectional view of an electrochemical cell 10 according to the present invention and FIG. 1A is a cross-sectional view of the cell 10 shown in FIG. 1. The cell 10 comprises an electrode assembly comprising an anode in the form of a layer of lithium 12 in electrical contact with the inner surface of a casing and segregated from a cathode 14 by an ionically porous polymeric separator 16 (FIG. 2). Thus, the electrode assembly is housed inside a casing 18 made of metal, such as stainless steel, titanium, nickel, aluminum, or other suitable electrically conductive materials. The casing 18 comprises a cylindrically-shaped tube 20 having an annular sidewall 20A extending along a longitudinal axis A-A from a proximal open end defined by a proximal circular edge or annular rim 20B to a distal open end defined by a distal circular edge or annular rim 20C. The casing tube 20 also has a thickness defined by the distance between an outer cylindrical surface 20D and an inner cylindrical surface 20E. The casing 18 can also be a deep-drawn or machined member comprising the casing tube 20 extending from the base wall 25 to the proximal annular rim 20B.

As shown in FIG. 1A, a glass-to-metal seal (GTMS) 21 closes the proximal open end of the casing tube 20. The GTMS comprises a ferrule 22 supporting an insulator glass 23 that seals between an inner surface of the ferrule and a terminal pin 24. The ferrule 22 is welded to the proximal annular rim 20B to close the proximal open end of the casing tube 20. The insulator glass 23 is of a corrosion resistant type having up to about 50% by weight silicon such as CABAL 12, TA 23, FUSITE 425 or FUSITE 435. The terminal pin 24 is of molybdenum, aluminum, nickel alloy, or stainless steel, the former being preferred. The casing tube 20 is closed at its distal open end by a lower base wall or base plate 25 that is secured to the casing tube with a weld 27.

Preferably, the electrochemical cell 10 is built in a case-negative design with the casing tube 20 serving as the negative terminal. However, the cell 10 can also be built in a case-positive design with the electrode 14 shown in FIGS. 1, 1A and 2 being the anode and the other electrode 12 being the cathode. Both the case-negative and case-positive electrode designs are well known by those skilled in the art.

Referring now to FIG. 2, the anode 12 comprises a cylindrically-shaped layer of lithium that is in direct physical contact with the inner cylindrical surface 20E of the casing tube 20. Preferably, there is a relatively short length of the casing tube adjacent to both its proximal end distal annular rims 20B, 20C that is left uncontacted by the lithium layer 12.

Figure 2A:
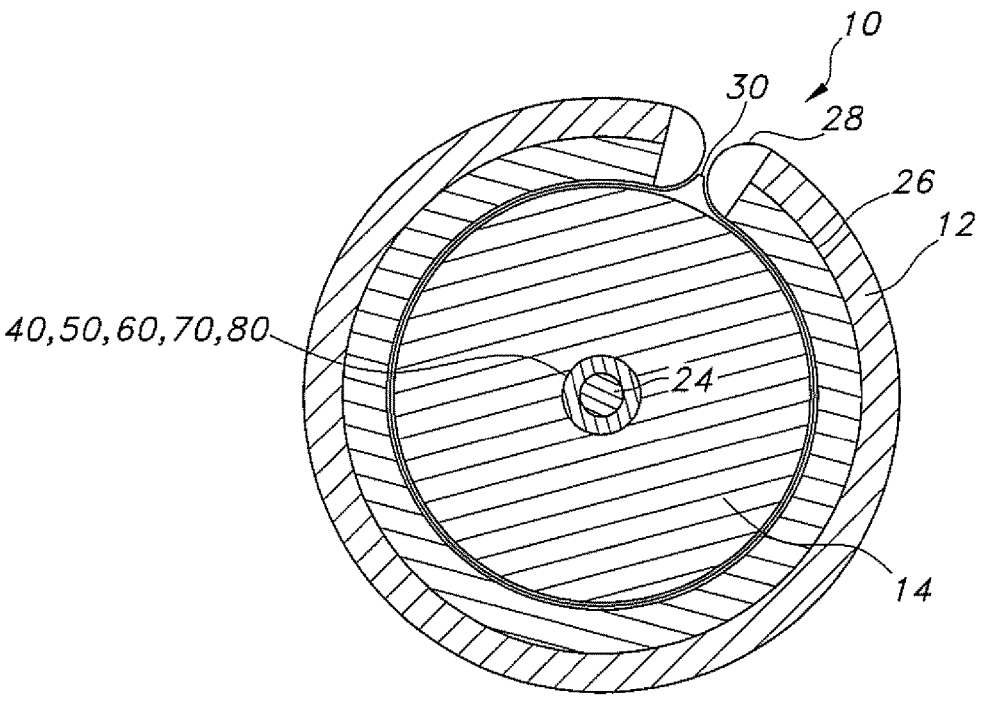
FIG. 2A is a cross-sectional view taken along line 2A-2A of FIG. 1.

FIG. 2A shows an alternate embodiment with the anode 12 comprising an anode current collector 26 having lithium contacted to both of its major sides. The anode current collector 26 is preferably of nickel, copper or stainless steel and preferably has a grid pattern of open perforations surrounded by a peripheral edge devoid of perforations. Alternatively, the anode current collector 26 may be completely solid. At least one and preferably a pair of spaced apart leads (not shown) extend outwardly from the current collector. The second anode lead provides a redundant termination with the leads connected to the casing 18 in a case-negative cell design. The anode 12 is fitted with its own ionically porous polymeric separator envelope 28.

Figures 3, 4:
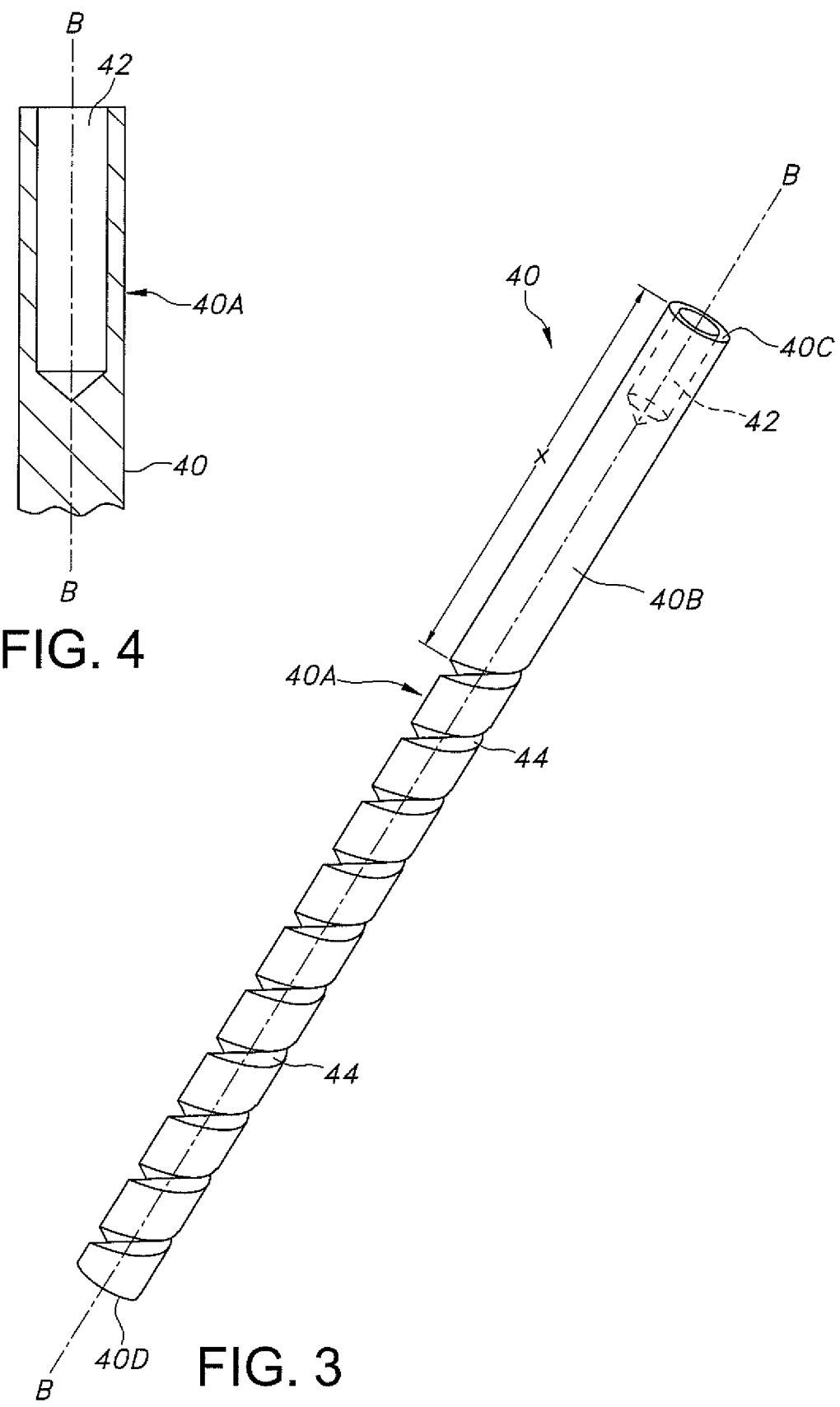
FIG. 3 is a perspective view of one embodiment of a cathode current collector 40 according to the present invention.
FIG. 4 is a cross-sectional view, partly broken away, of a longitudinally aligned, co-axial counter bore 42 in the proximal portion 40B of the current collector 40 shown in FIG. 12.

Regarding the cathode 14, FIGS. 3 and 4 illustrate one embodiment of a cathode current collector 40 according to the present invention. The current collector 40 is a rod-shaped member having an outer surface 40A in the shape of a cylinder aligned along a longitudinal axis B-B with an axial length extending from a proximal current collector portion 40B having a proximal end 40C to a distal current collector end 40D. A longitudinally aligned, co-axial counter bore 42 is provided in the proximal portion 40B such as by drilling, and the like. The bore 42 has a diameter and depth sufficient to receive the proximal end of the terminal pin 24 of the previously described GTMS 21.

The proximal portion 40B of the current collector 40 has a relatively smooth outer surface. However, a helical groove 44 beginning at a distance "x" spaced distally from the proximal end 40C winds as a three-dimensional narrow channel or depression that turns around the longitudinal axis B-B of the rod-shaped member at a constant distance while moving parallel to the axis. The helical groove 44 extends substantially to the distal end 40D of the current collector.

The depth of the helical groove 44 into the current collector 40 does not meet the longitudinal axis B-B. Moreover, the current collector 40 is devoid of any feature extending radially outwardly beyond the outer surface 40A.

Figures 5, 5A:
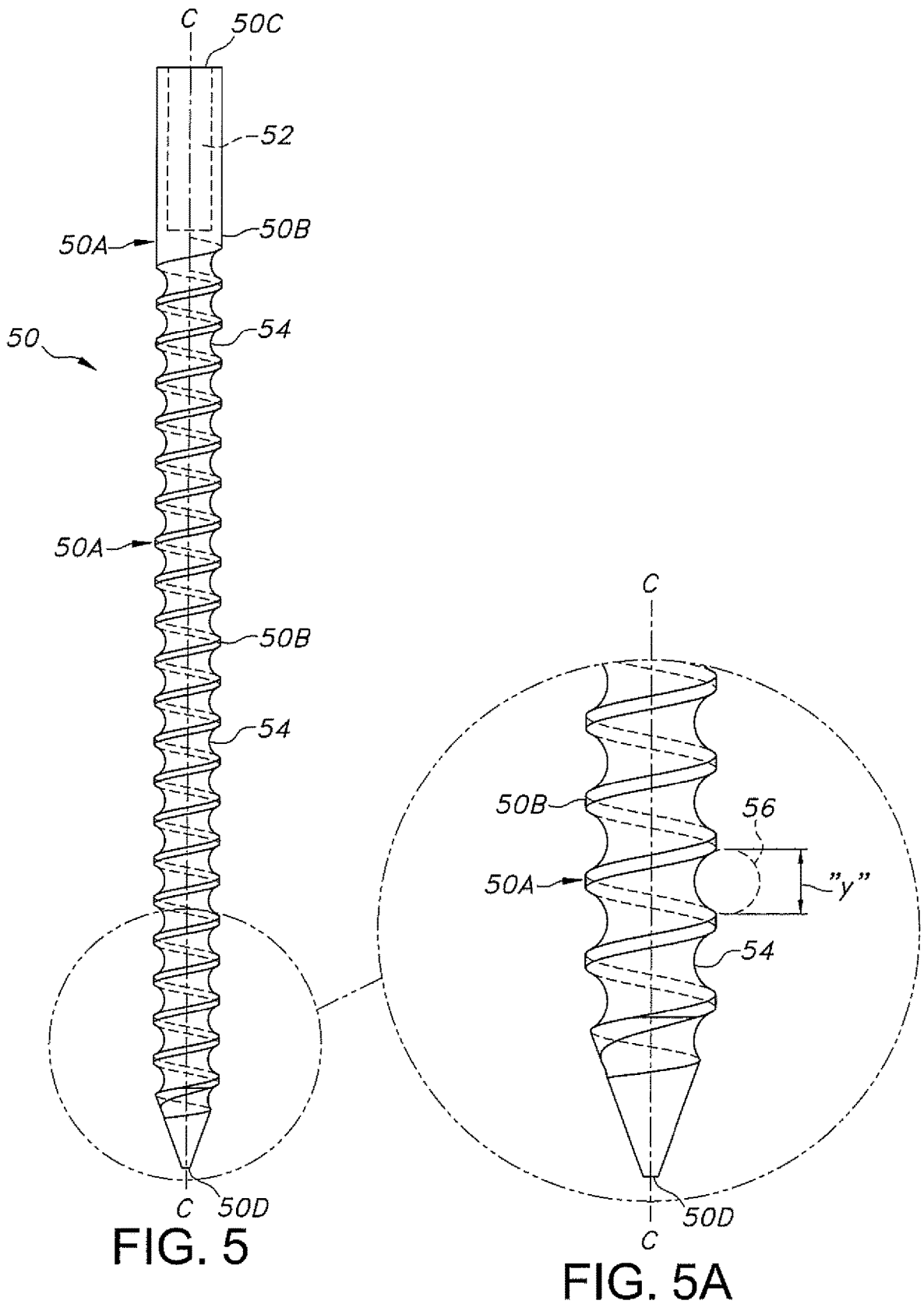
FIG. 5 is an elevation view, partly in phantom, of another embodiment of a cathode current collector 50 according to the present invention.
FIG. 5A is an enlarged view of the indicated area shown in FIG. 5.

FIGS. 5 to 5A illustrate another embodiment of a cathode current collector 50 according to the present invention. The current collector 50 is a rod-shaped member having an outer surface 50A in the shape of a cylinder aligned along a longitudinal axis C-C with an axial length extending from a proximal current collector portion 50B having a proximal end 50C to a distal current collector end 50D. A longitudinally aligned, co-axial counter bore 52 is provided in the proximal portion 508. The bore 52 has a diameter and depth sufficient to receive the proximal end of the terminal pin 24 of the GTMS 21.

The proximal portion 50B of the current collector 50 has a relatively smooth outer surface. However, unlike the helical groove 44 illustrated in the current collector 40 shown in FIG. 3, this current collector 50 has a helical groove 54 beginning distal the relatively smooth proximal portion 50B as a narrow channel or depression having the shape in cross-section of a segment of a circle 56 (FIG. 5A-shown in phantom having a diameter of "y") that turns around the longitudinal axis C-C of the rod-shaped member at a constant distance while moving parallel to the axis along the remaining length of the rod-shaped member. The helical groove 54 extends substantially to the distal end 50D of the current collector. The depth of the helical groove 54 into the current collector 50 does not meet the longitudinal axis C-C. Moreover, the current collector 50 is devoid of any feature extending radially outwardly beyond the outer surface 50A.

Figures 6, 6A:
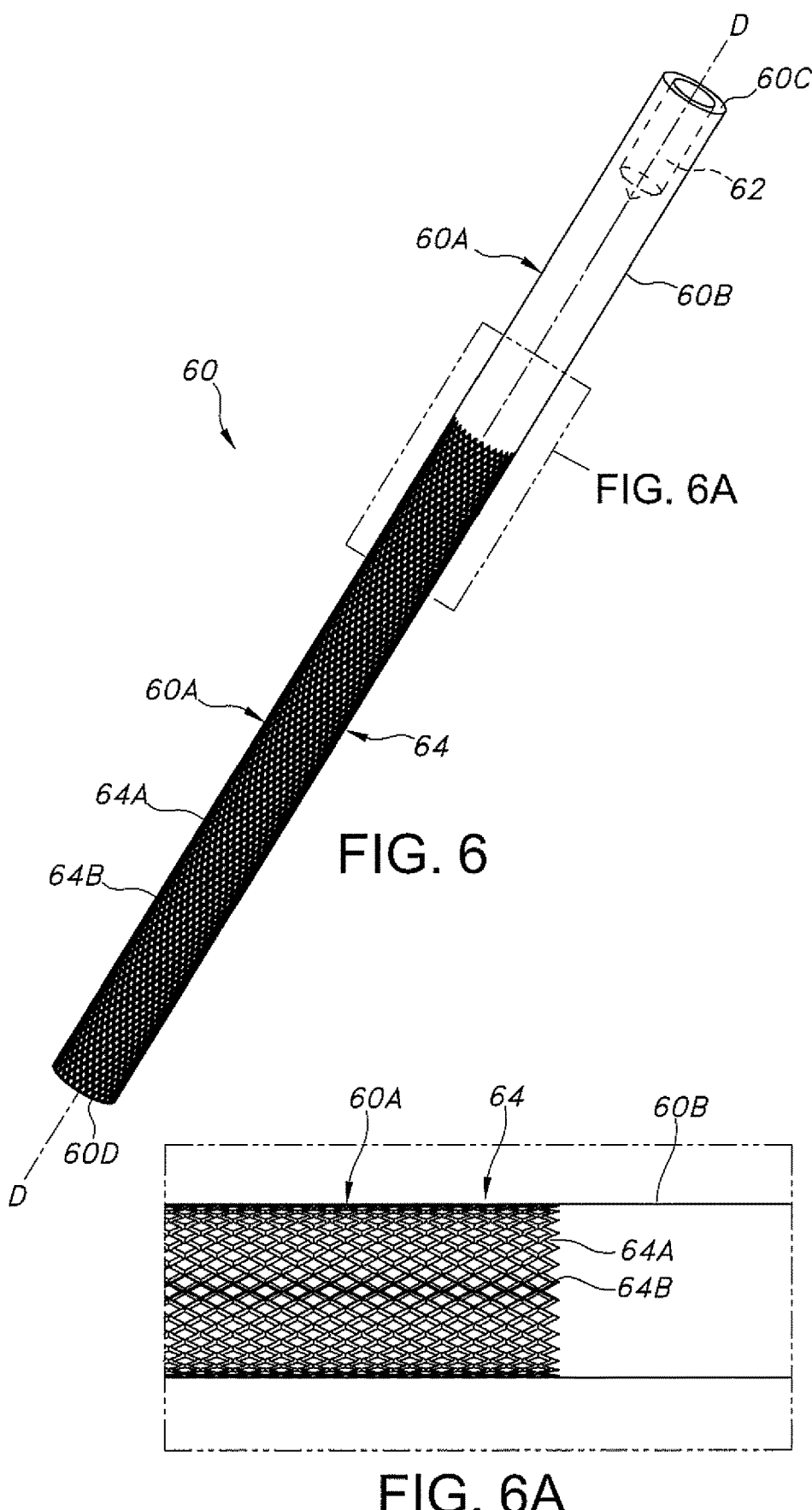
FIG. 6 is a perspective view, partly in phantom, of another embodiment of a cathode current collector 60 according to the present invention.
FIG. 6A is an enlarged view of the indicated area shown in FIG. 6.

FIGS. 6 and 6A illustrate another embodiment of a cathode current collector 60 according to the present invention. The current collector 60 is a rod-shaped member having an outer surface 60A in the shape of a cylinder aligned axially along a longitudinal axis D-D with an axial length extending from a proximal current collector portion 60B having a proximal end 60C to a distal current collector end 60D. A longitudinally aligned, co-axial counter bore 62 is provided in the proximal portion 60B. The bore 62 has a diameter and depth sufficient to receive the proximal end of the terminal pin 24 of the GTMS 21.

The proximal portion 60A of the current collector 60 has a relatively smooth outer surface. However, beginning distal the relatively smooth proximal portion 60B, a knurled surface 64 as a pattern of crisscrossing helical grooves 64A and 64B extends to the distal end thereof 60D. As viewed from a perspective looking straight down at the proximal end 60C of the current collector 60A, the crisscrossing pattern of helical grooves comprises a clock-wise extending helical groove 64A that winds as a three-dimensional narrow channel or depression turning around the longitudinal axis D-D of the rod-shaped member at a constant distance while moving parallel to the axis, and a counter-clockwise extending helical groove 64B that winds as a three-dimensional narrow channel or depression turning around the longitudinal axis D-D of the rod-shaped member at a constant distance moving parallel to the axis as it intersects the clock-wise extending helical groove 64A. The knurled surface 64 extends substantially to the distal end 60D of the current collector 60. The depth of the crisscrossing helical grooves 64A and 64B into the current collector 60 does not meet the longitudinal axis D-D. Moreover, the current collector 60 is devoid of any feature extending radially outwardly beyond the outer surface 60A.

Figures 7, 7A:
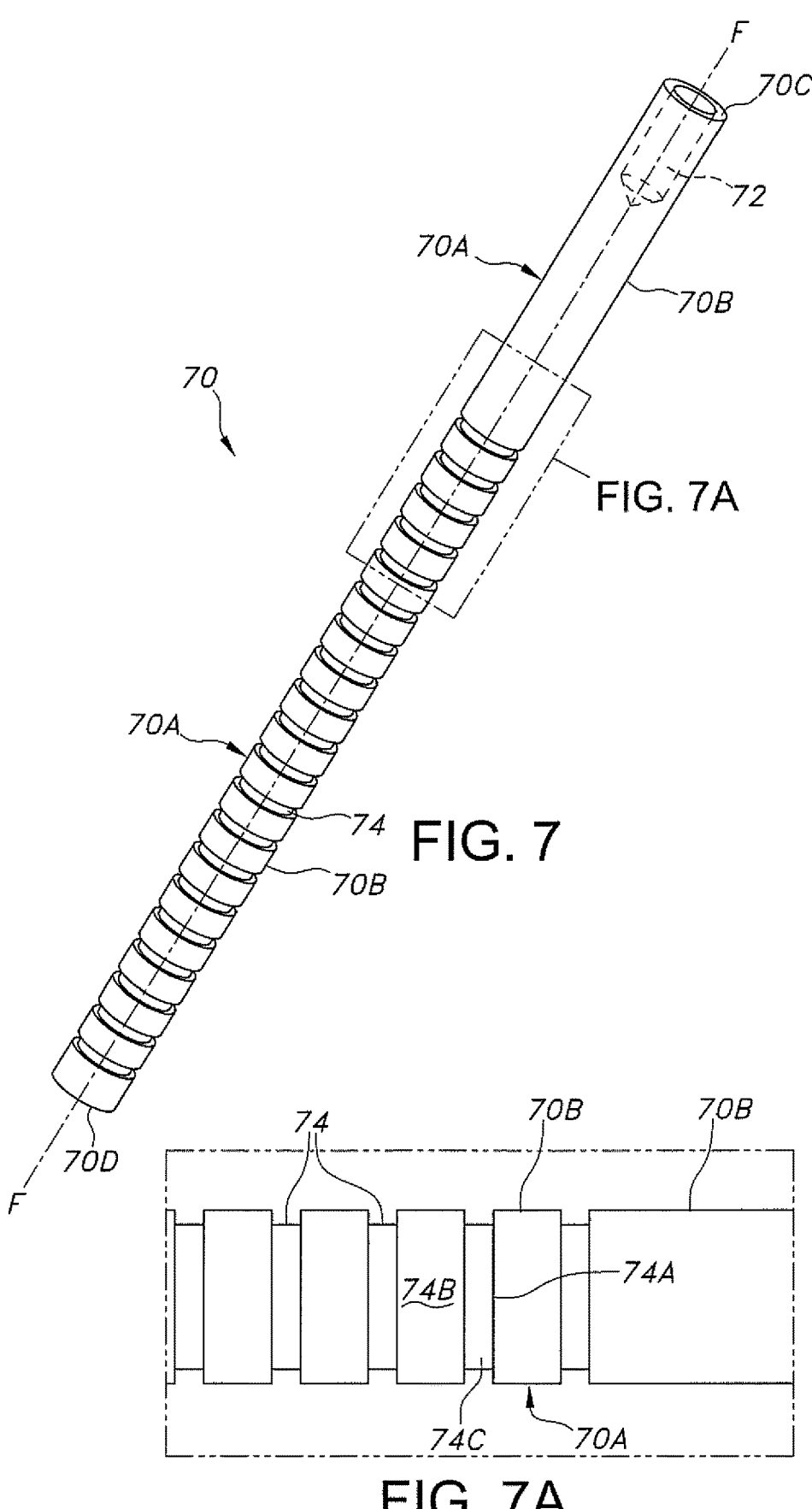
FIG. 7 is a perspective view, partly in phantom, of another embodiment of a cathode current collector 70 according to the present invention.
FIG. 7A is an enlarged view of the indicated area shown in FIG. 7.

FIGS. 7 and 7A illustrate another embodiment of a cathode current collector 70 according to the present invention. The current collector 70 is a rod-shaped member having an outer surface 70A in the shape of a cylinder aligned along a longitudinal axis F-F with an axial length extending from a proximal current collector portion 70B having a proximal end 70C to a distal current collector end 70D. A longitudinally aligned, co-axial counter bore 72 is provided in the proximal portion 70B. The bore 72 has a diameter and depth sufficient to receive the proximal end of the terminal pin 24 of the glass-to-metal seal 21.

The proximal portion 70B of the current collector 70 has a relatively smooth outer surface. However, beginning distal the relatively smooth proximal portion 70B, a series of annular grooves 74 are spaced at regular or irregular intervals along the remaining length of the current collector 70 to adjacent to the distal end 70D thereof. As more clearly shown in FIG. 7A, each annular groove 74 comprises spaced apart annular sidewalls 74A and 74B recessed into the thickness of the current collector to an annular bottom wall 74C. The annular sidewalls 74A and 74B are aligned perpendicular to the axis F-F and meet the annular bottom wall 74C at a right angle. The annular bottom wall 74C of each groove 74 is co-axial with the axis F-F. Moreover, the current collector 70 is devoid of any feature extending radially outwardly beyond the outer surface 70A.

Figures 8, 8A:
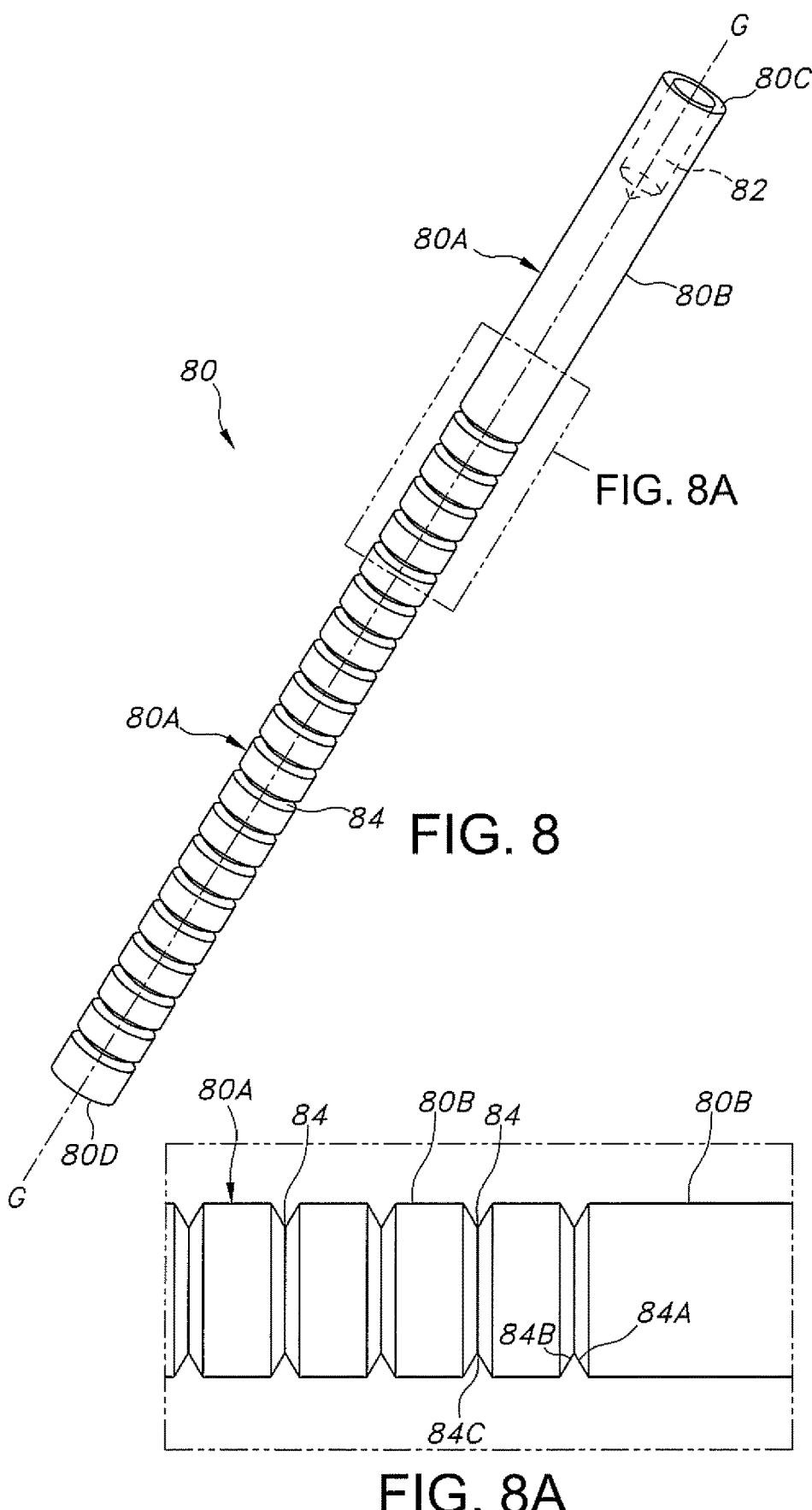
FIG. 8 is a perspective view, partly in phantom, of another embodiment of a cathode current collector 80 according to the present invention.
FIG. 8A is an enlarged view of the indicated area shown in FIG. 8.
Figure 9:
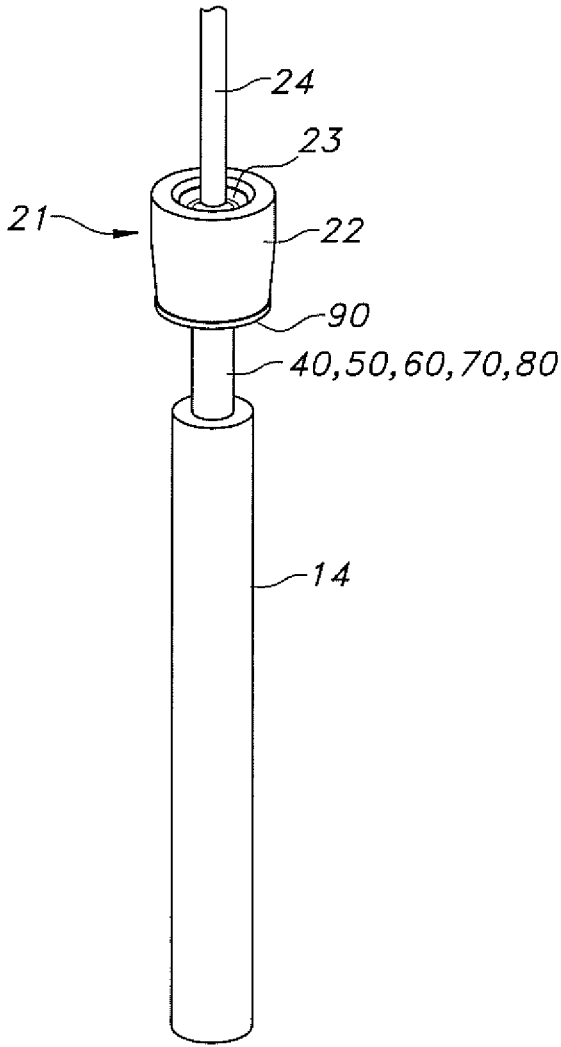
FIG. 9 is a perspective view showing the cathode 14 supported on an exemplary current collector 40 according to the present invention with the current collector connected to the terminal pin 24 for a glass-to-metal seal 21.

FIGS. 8 and 8A illustrate another embodiment of a cathode current collector 80 according to the present invention. The current collector 80 is a rod-shaped member having an outer surface 80A in the shape of a cylinder aligned along a longitudinal axis G-G with an axial length extending from a proximal current collector portion 80B having a proximal end 80C to a distal current collector end 80D. A longitudinally aligned, co-axial counter bore 82 is provided in the proximal portion 80B. The bore 82 has a diameter and depth sufficient to receive the proximal end of the terminal pin 24 of the glass-to-metal seal 21.

The proximal portion 80B of the current collector 80 has a relatively smooth outer surface. However, beginning distal the relatively smooth proximal portion 80B, a series of annular grooves 84 are spaced at regular or irregular intervals along the remaining length of the current collector 80 to adjacent to the distal end 80D thereof. As more clearly shown in FIG. 8A, each annular groove 84 comprises spaced apart angled annular sidewalls 84A and 84B extending into the thickness of the current collector 80 to meet at an annular vertex 84C. Moreover, the current collector 80 is devoid of any feature extending radially outwardly beyond the outer surface 80A.

The cathode 14 is then assembled by contacting a cathode active material, for example, fluorinated carbon $CF_x$, to one of the current collectors 40, 50, 60, 70 and 80. The cathode active material 14 as a cylindrically-shaped unitary body is supported in a surrounding and contact relationship with one of the previously described current collectors 40, 50, 60, 70 and 80 so that the active material fills in and resides in the respective groove 44, 54, 64, 74 and 84. That way, the cylindrically-shaped cathode 14 has a substantially circular cross-section along the longitudinal axis of the current collector 40, 50, 60, 70 and 80.

An important aspect of the present electrochemical cell 10 is that the grooves 44, 54, 64, 74 and 84 serve as irregularly-shaped surfaces that prevent the cathode active material from losing contact with the respective current collector 40, 50, 60, 70 and 80. That way, the cathode active material is incapable of sliding in an axial direction along the current collector 40, 50, 60, 70 and 80 as well as separating and delaminating from the outer surface 40A, 50A, 60A, 70A and 80A thereof.

Suitable materials for the current collectors 40, 50, 60, 70 and 80 include titanium, carbon coated titanium for use with $CF_x$, tantalum, platinum, gold, aluminum, cobalt nickel alloys, highly alloyed ferritic stainless steel containing molybdenum and chromium, and nickel-, chromium- and molybdenum-containing alloys, the former being preferred.

The cathode active material comprising the cathode 14 is preferably fluorinated carbon ($CF_x$). However, other suitable cathode active materials include silver vanadium oxide (SVO), copper silver vanadium oxide, copper vanadium oxide, manganese dioxide, titanium disulfide, copper oxide, copper sulfide, iron sulfide, iron disulfide, lithium cobalt oxide, and mixtures thereof.

A polymeric insulator disc 90 is supported on the terminal pin 24, seated against the ferrule 22. In this position, the outer surrounding edge of the disc 90 meets the inner cylindrical surface 20E of the casing tube 20. The insulator disc 90 is of a fluoro-polymer, such as ethylene tetrafluoroethylene (ETFE), and helps prevent attack of the insulator glass 23 by the electrolyte. The terminal pin 24 is then slip-fit into the co-axial counter bore 42 in the proximal portion 40B of the exemplary current collector 40 and resistance welded thereto to connect the GTMS 21 to the cathode 14. The terminal pin 24 is connected to the other current collectors 50, 60, 70 and 80 of the present invention in a similar manner. That is the terminal pin 24 is received in and welded to the co-axial counter bore in the proximal portion 50B, 60B, 70B and 80B of those current collectors.

Next, the cathode 14 is enveloped in an ionically porous polymeric separator 16 (FIG. 2) and separator 30 (FIG. 2A). The proximal current collector portion 40B, 50B, 60B, 70B and 80B protrudes outwardly from the separator 16, 30 for connection to the terminal pin 24. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C.H. Dexter, Div., Dexter Corp.).

The height of the anode 16 along the axial length of the casing tube 20 is somewhat longer than the height of the cathode 14 along the longitudinal axis of the respective rod-shaped current collector 40, 50, 60, 70 and 80. The greater height of the anode 16 in comparison to the cathode 14 accommodates for some misalignment between the electrodes while maintaining anode material always opposite the cathode active material.

As previously described, the terminal pin 24 is supported in the GTMS 21 by the insulator glass 23. The ferrule 22 of the GTMS 21 is welded, such as by laser welding, to the proximal open end of the casing tube 20 to hermetically close the proximal open end of the casing tube. The terminal pin 24 contacting the cathode active material 14 by the intermediate current collector 40, 50, 60, 70 and 80 and electrically isolated from the GTMS 21 and casing 18 by the insulator glass 23 serves as the positive terminal for the electrochemical cell 10.

An electrolyte (not shown) is then filled into the casing tube 20 through the lower open end 20C thereof to activate the electrode assembly before a circular-shaped base wall 25 is hermetically secured in the casing tube by laser welding (FIG. 1A). The base wall 25 is of the same material as the casing tube 20. The casing 18 can also be a deep-drawn or machined member comprising a casing tube extending from a base plate as a unitary wall with the casing tube to the proximal annular rim 20B.

By way of example, in an illustrative primary cell, anode comprising lithium 12 contacted to the inner surface 20E of the casing tube 20 or through the anode current collector leads (not shown) previously described with respect to the embodiment shown in FIG. 2A serve as the negative terminal for the electrochemical cell 10. The preferred cathode active material is $CF_x$ contacted to one of the previously described rod-shaped cathode current collectors 40, 50, 60, 70 and 80. This electrochemical couple is preferably activated with an exemplary electrolyte comprising a 1.0M solution of $LiBF_4$ in $\gamma$-butyrolactone. A lithium/silver vanadium oxide (Li/SVO) couple is typically activated with an electrolyte comprising 1.0M to 1.4M of $LiAsF_6$ or $LiPE_6$ in a 50:50 mixture of, by volume, 1,2-dimethoxyethene and propylene carbonate.

It is appreciated that various modifications to the inventive concepts described herein may be apparent to those of ordinary skill in the art without departing from the scope of the present invention as defined by the appended claims.

What is claimed is:

1. An electrochemical cell, comprising:
a) a casing, comprising:
   i) a casing tube extending from a base wall to an upper annular edge, the casing tube having an outer surface spaced from an inner annular surface; and
   ii) a glass-to-metal seal (GTMS) comprising an insulator glass contacting a terminal pin centered inside a ferrule, wherein the ferrule is secured to the upper annular edge of the casing tube; and
b) an electrode assembly housed inside the casing, the electrode assembly comprising:
   i) an anode active material contacted to the inner annular surface of the casing tube, wherein the anode active material has a tube shape forming a lumen;
   ii) a cathode current collector comprising a rod having a cylindrically-shaped outer surface extending along a longitudinal axis, wherein at least one helical groove recessed into the cylindrically-shaped outer surface of the rod turns around the longitudinal axis at a constant distance while moving parallel to the longitudinal axis, and wherein the current collector is devoid of any feature extending radially outwardly beyond the cylindrically-shaped outer surface of the rod;
   iii) a cathode comprising a cathode active material in direct physical contact with the cathode current collector, wherein the cathode has a cylindrical shape and resides in the lumen of the tube-shaped anode active materials and
   iv) a separator segregating the anode active material from directed physical contact with the cathode active material; and
c) an electrolyte in the casing activating the electrode assembly,
d) wherein the casing tube contacting the anode active material serves as an anode terminal, and wherein the cathode current collector contacting the cathode active material and being connected to the terminal pin electrically isolated from the casing tube by the GIMS serves as the cathode terminal for the cell.

2. The electrochemical cell of claim 1, wherein the at least one helical groove is a narrow channel having the shape in cross-section of a segment of a circle that turns around the longitudinal axis of the at a constant distance while moving parallel to the longitudinal axis of the rod.

3. The electrochemical cell of claim 1, wherein two crisscrossing helical grooves recessed into the cylindrically-shaped outer surface of the rod turn around the longitudinal axis in opposed clockwise and counterclockwise directions at a constant distance while moving parallel to the longitudinal axis of the rod.

4. The electrochemical cell of claim 1, wherein the rod has a longitudinally aligned, co-axial counter bore, and wherein a proximal end of the terminal pin is received in the counter bore.

5. The electrochemical cell of claim 4, wherein a portion of the outer surface of the rod adjacent to the terminal pin is uncontacted by cathode active material.

6. The electrochemical cell of claim 1, wherein the anode active material is lithium, and the cathode active material is fluorinated carbon ($CF_x$).

7. The electrochemical cell of claim 1 having a total volume that is less than 0.5 cc.

8. An electrochemical cell, comprising:
a casing, comprising:
   i) a casing tube extending from a base wall to an upper annular edge, the casing tube having an outer surface spaced from an inner annular surface; and
   ii) a glass-to-metal seal (GTMS) comprising an insulator glass contacting a terminal pin centered inside a ferrule, wherein the ferrule is secured to the upper annular edge of the casing tube; and
b) an electrode assembly housed inside the casing, the electrode assembly comprising:
   i) lithium directly contacting the inner annular surface of the casing tube, wherein the lithium has a tube shape forming a lumen;
   ii) a cathode current collector comprising a rod having a cylindrically-shaped outer surface extending along a longitudinal axis, wherein at least one helical groove recessed into the cylindrically-shaped outer surface of the rod turns around the longitudinal axis at a constant distance while moving parallel to the longitudinal axis, and wherein the current collector is devoid of any feature extending radially outwardly beyond the cylindrically-shaped outer surface of the rod;
   iii) a cathode comprising fluorinated carbon ($CF_x$) directly contacting the cathode current collector including the at least one helical groove, wherein the cathode has a cylindrical shape and resides in the lumen of the tube-shaped lithium; and
   iv) a separator segregating the tube-shaped lithium from directed physical contact with the cathode; and
c) an electrolyte in the casing activating the electrode assembly,
d) wherein the casing tube contacting the lithium serves as an anode terminal, and wherein the cathode current collector contacting the $CF_x$, and being connected to the terminal pin electrically isolated from the casing tube by the GIMS serves as the cathode terminal for the cell.

9. The electrochemical cell of claim 8, wherein the at least one helical groove is a narrow channel having the shape in cross-section of a segment of a circle that turns around the longitudinal axis of the rod at a constant distance while moving parallel to the longitudinal axis of the rod.

10. The electrochemical cell of claim 8, wherein two crisscrossing helical grooves recessed into the cylindrically-shaped outer surface of the rod turn around the longitudinal axis in opposed clockwise and counterclockwise directions at a constant distance while moving parallel to the longitudinal axis of the rod.

11. The electrochemical cell of claim 8, wherein the rod has a longitudinally aligned, co-axial counter bore, and wherein a proximal end of the terminal pin is received in the counter bore.

* * * * *